C. E. COX.
GEARING.
APPLICATION FILED DEC. 6, 1911.

1,101,524.

Patented June 30, 1914.

Witnesses
Frank A. Fahle
May Layden

Inventor
Claude E. Cox,
By Arthur M. Hood
Attorney

UNITED STATES PATENT OFFICE.

CLAUDE E. COX, OF DETROIT, MICHIGAN.

GEARING.

1,101,524. Specification of Letters Patent. Patented June 30, 1914.

Application filed December 6, 1911. Serial No. 664,235.

*To all whom it may concern:*

Be it known that I, CLAUDE E. Cox, a citizen of the United States, residing at Detroit, in the county of Wayne and State of Michigan, have invented a new and useful Gearing, of which the following is a specification.

The object of my invention is to produce a mechanism by means of which oscillation with successive forward advancement of a rotary member may be produced, the apparatus being especially designed for manipulation of valves to grind the same into their seats.

The accompanying drawings illustrate my invention.

Figure 1:
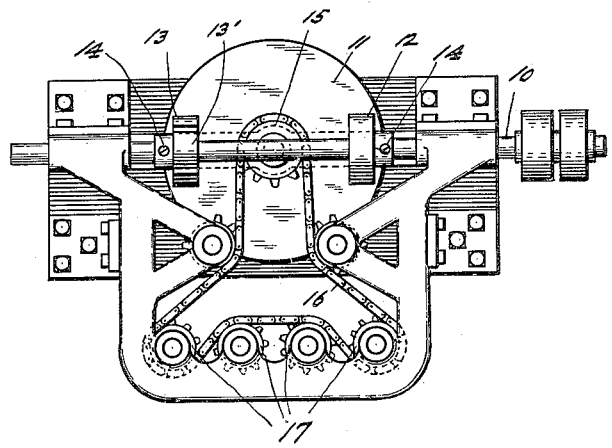
Figure 2:
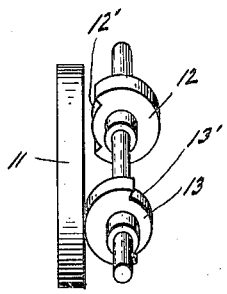
Figure 3:
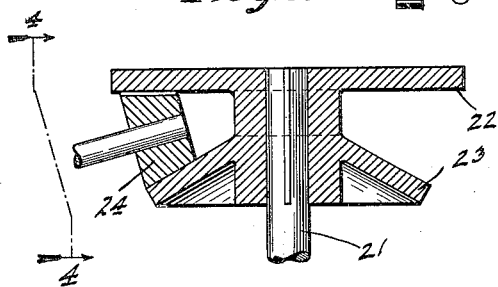

Figure 1 is a plan of an apparatus embodying my invention; Fig. 2 a perspective detail; Fig. 3 an axial section of another form in which there are two driven disks and one driving disk, and Fig. 4 a section on line 4—4 of Fig. 3.

In Figs. 1 and 2 of the drawings, 10 indicates a shaft intended to be driven continuously in one direction. Journaled with its axis at an angle to the axis of shaft 10 is a disk 11, the face of which is arranged to be engaged by the circumference of two driving wheels 12 and 13 which are longitudinally adjustable upon shaft 10 by any suitable means, such as set screws 14. Wheel 12 is cut away at 12' for a portion of its circumference and wheel 13 is cut away at 13' for a portion of its circumference, the arrangement being such that wheels 12 and 13 will alternately engage with disk 11. The two wheels 12 and 13 are then placed upon shaft 10 in such position that they will engage disk 11 upon opposite sides of its axis so as to have a driving effect upon said disk in opposite directions. Having regard to the circumferential dimensions of the cut away portions 12' and 13', the two driving wheels 12 and 13 are so set upon shaft 10 that the driving effect of one of the wheels upon disk 11 will be greater than the driving effect of the other of said wheels upon the disk so that continuous rotation of shaft 10 will not only produce oscillation of disk 11, but will also produce intermittent advancement because the oscillatory movement of the disk in one direction will be greater than the oscillatory movement of the disk in the other direction. The disk 11 may be directly connected to a single valve engaging member or, as shown in the drawings, the said disk may carry a sprocket wheel 15 connected by a chain 16 with a multiplicity of sprocket wheels 17, the shaft of each of which may be provided with means to engage a valve, in a well known manner, the construction being such that the apparatus as shown in Fig. 1 may be associated with an engine at its valves in such manner that the stems of the several sprocket wheels 17 may simultaneously engage a plurality of valves to be ground.

Figure 4:
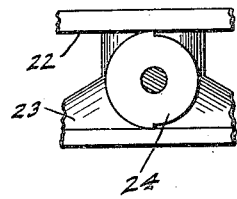

In Figs. 3 and 4 the driven shaft 21 carries a pair of axially separated disks 22 and 23 between which is inserted a driving disk 24 having one-half of its circumference cut away, as indicated in Fig. 4, so that continuous rotation of the driving disk will bring the larger diameter portion of its periphery alternately into engagement with the two disks and thus produce oscillation on shaft 21. By making the working face of disk 23 at an angle to the working face of disk 22, and setting the driving shaft at an angle less than 90° to shaft 21, progressive advancement of the shaft 21 may be had owing to the fact that rotation of the driving disk 24 will have a greater advancing effect upon shaft 21 through disk 23 than the retrograde effect upon shaft 21 through disk 22.

I claim as my invention:

1. The combination with a continuously rotatable shaft, of a friction disk arranged adjacent said shaft with its axis at an angle thereto, and two mutilated friction driving wheels mounted upon said shaft and engaging said friction disk upon opposite sides of its axis, one of said mutilated friction driving wheels having greater driving effect upon the friction disk than the other of said mutilated friction driving wheels.

2. The combination of a rotatable friction disk and two mutilated friction driving wheels engaging said disk to alternately drive the same in opposite directions, one of said mutilated driving wheels having a greater effect upon the disk than the other.

3. The combination of two friction elements, one arranged to drive the other, one of said friction elements comprising two working friction faces coöperating with the working friction face of the other element, and one of said elements being mutilated with respect to the other whereby continuous movement of the driving element will produce reciprocation of the driven element, and the friction elements being relatively adjustable so that the relative angular extent of movement of the driven element in opposite directions may be varied.

4. The combination of two interacting friction elements, one arranged to drive the other, one of said interacting elements comprising two friction working portions coöperating with a friction working portion of the other element, and one of said elements being mutilated with respect to the other and said two elements being so relatively located that continuous movement of the driving element will produce reciprocation and step-by-step advancement of the driven element.

5. The combination with a continuously rotatable shaft, of a disk arranged adjacent said shaft with its axis at an angle thereto, and two mutilated driving wheels axially adjustable upon said shaft and engaging said disk upon opposite sides of its axis.

6. The combination of two shafts one arranged at an angle to the other, one of said shafts carrying a two-faced friction element and the other a single-faced friction element, said two friction elements coöperating and the driving friction element being mutilated so that the two faces of the first-named friction element alternately frictionally engage the friction face of the second friction element, said two friction elements being relatively adjustable to vary the angles of alternate movements of the driven shaft.

7. The combination of two shafts one arranged at an angle to the other, one of said shafts carrying a two-faced friction element and the other a single-faced friction element, said two friction elements coöperating and the driving friction element being mutilated so that the two faces of the first-named friction element alternately frictionally engage the friction face of the second friction element, the engagement between one of the faces of the two-faced friction element and the second friction element producing a greater angular movement of the driven shaft than does the engagement between the other of the faces of the two-faced friction element and the second friction element.

In witness whereof, I have hereunto set my hand and seal at Indianapolis, Indiana, this 2nd day of December, A. D., one thousand nine hundred and eleven.

CLAUDE E. COX. [L. S.]

Witnesses:
ARTHUR M. HOOD,
FRANK A. FAHLE.

---

Copies of this patent may be obtained for five cents each, by addressing the "Commissioner of Patents, Washington, D. C."